(12) United States Patent
Pettersson et al.

(10) Patent No.: US 6,268,611 B1
(45) Date of Patent: Jul. 31, 2001

(54) FEATURE-FREE REGISTRATION OF DISSIMILAR IMAGES USING A ROBUST SIMILARITY METRIC

(75) Inventors: Magnus Pettersson, Västerås; Anders Rosenqvist, Lund; Anders Heyden, Dalby; Martin Almers, Lund, all of (SE)

(73) Assignee: Cellavision AB (SE)

( * ) Notice: Subject to any disclaimer, the term of this patent is extended or adjusted under 35 U.S.C. 154(b) by 0 days.

(21) Appl. No.: 09/212,730

(22) Filed: Dec. 16, 1998

Related U.S. Application Data

(60) Provisional application No. 60/071,176, filed on Dec. 18, 1997.

(51) Int. Cl.[7] .................................................. G01N 21/86
(52) U.S. Cl. ..................... 250/559.3; 382/284; 382/255; 382/294; 358/450
(58) Field of Search .............................. 250/559.3, 201.2, 250/201.4, 201.7, 201.8, 559.39, 559.4; 382/151, 206, 209, 215, 216, 294, 284, 293, 255, 268, 289; 356/390, 139.04, 394, 400, 401; 345/425; 348/345, 350, 335; 358/450

(56) References Cited

U.S. PATENT DOCUMENTS

| | | |
|---|---|---|
| 5,539,841 | 7/1996 | Huttenlocher et al. . |
| 5,649,032 * | 7/1997 | Burt et al. ............................. 382/284 |
| 5,657,402 | 8/1997 | Bender et al. . |
| 5,706,416 * | 1/1998 | mann et al. ........................... 395/127 |
| 6,075,905 * | 6/2000 | Herman et al. ....................... 382/284 |

OTHER PUBLICATIONS

Venu Govindu et al., *Using Geometric Properties for Correspondence–less Image Alignment*, pp., 37–41, 1998.
John Y. Chiang and Barry J. Sullivan, *Coincident Bit Counting–A New Criterion for Image Registration*, IEEE Transactions On Medical Imaging, vol. 12, No. 1, pp. 30–38, Mar. 1993.
Petra A. van den Elsen, et al., *Medical Image Matching–A Review with Classification*, IEEE Engineering In Medicine And Biology, pp. 26–39, Mar. 1993.
Lisa G. Brown, *A Survey of Image Registration Techniques*, ACM Computing Surveys, vol. 24, No. 4, pp. 325–376, Dec. 1992.
Lindgren and Rootzén, *Stationära Stokastika Processor*, (*Stationary Stochastic Processes*), KF–Sigma, Lund, pp. 183–186, 1992.
A. Venot et al., *A New Class of Similarity Measures for Robust Image Registration*, Computer Vision, Graphics, and Image Processing, vol. 28, pp. 176–184, 1984.

* cited by examiner

Primary Examiner—Que T. Le
Assistant Examiner—Thanh X. Luu
(74) Attorney, Agent, or Firm—Cooper & Dunham LLP

(57) ABSTRACT

An image registration (alignment) system which achieves alignment by determining an optimal focus for a composite image produced from the combination of misregistered images. The system also uses optimal or nearly optimal linear filters for filtering the combined image to emphasize (enhance) alignment information in the combined image and to de-emphasize (damp) noise. One set of the nearly optimal linear filters are modified second order difference filters in which the number of internal zeros are modified to tune the filter to the particular equipment.

25 Claims, 10 Drawing Sheets

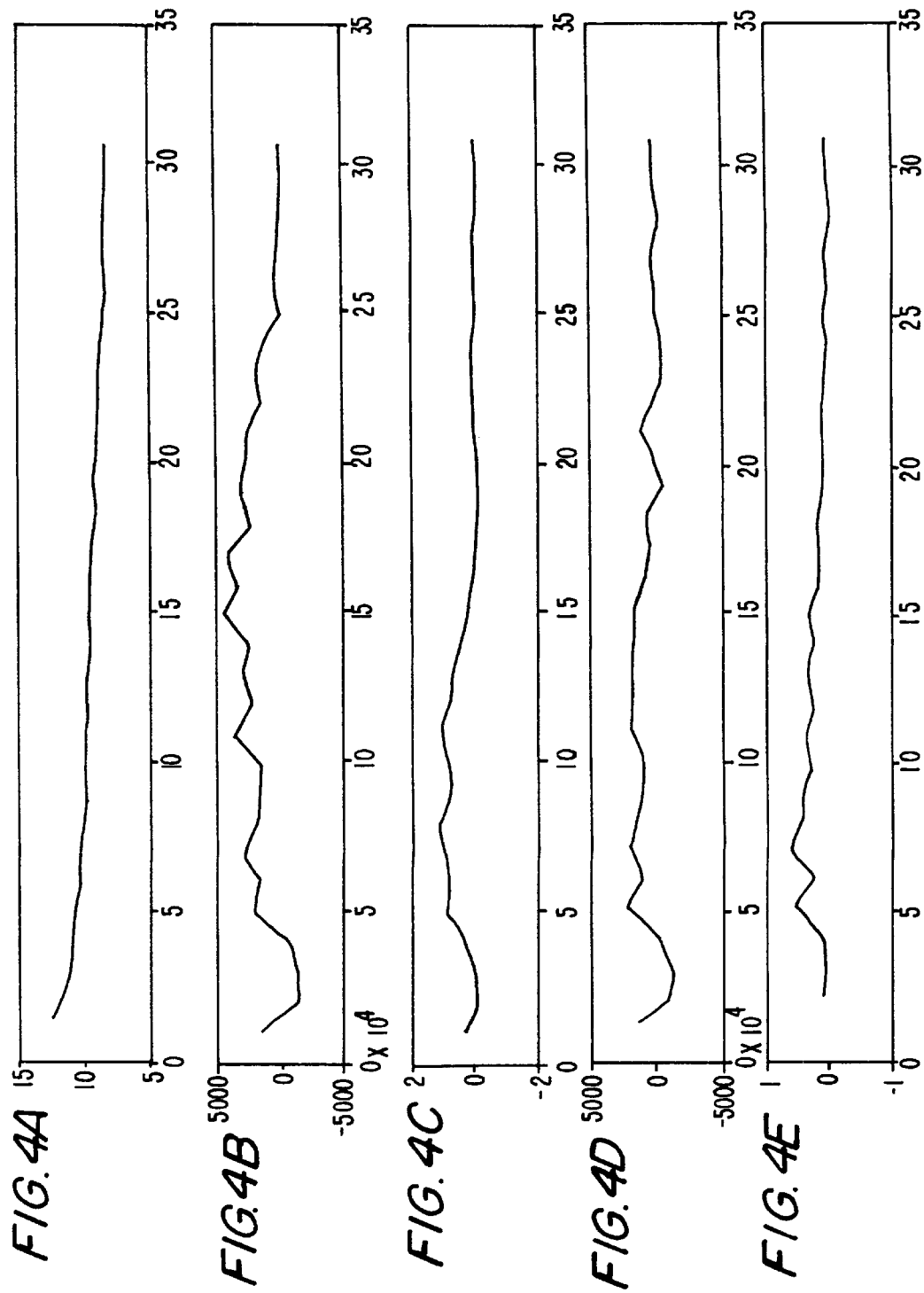

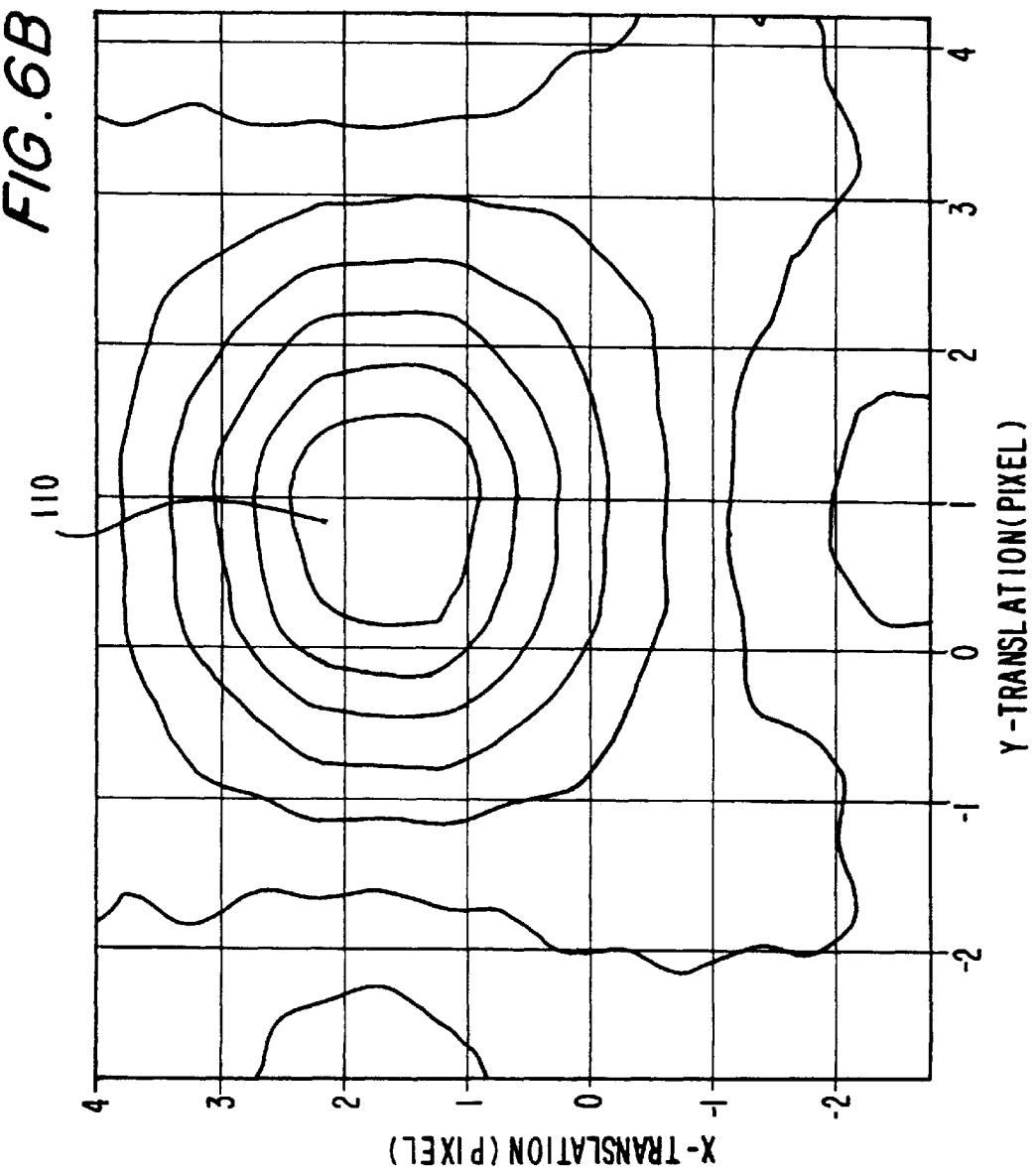

FEATURE-FREE REGISTRATION OF DISSIMILAR IMAGES USING A ROBUST SIMILARITY METRIC

This application claims the benefit of U.S. Provisional Application No. 60/171,176 filed Dec. 18, 1997. The Provisional Application is incorporated by reference.

FIELD OF THE INVENTION

This invention relates to registration (alignment) of images and more particularly, to a system for measuring similarity between images (similarity metric) which allows for robust registration of dissimilar images, that is, images in which some of the details are not identical to both images.

BACKGROUND OF THE INVENTION

Registration is useful for many reasons: for example, to compare two or more images obtained at different times, or to align images taken by sensors having different spectral responses, such as sensitivity to different coloured lights.

One type of registration combines the two images to be aligned into a composite image to obtain information as to how to better align the images. Such a composite image can be processed by considering the following: (1) the feature space (what features within the images to look for) ; (2) the search space (how one image can be 'moved' relative to the other); (3) the search strategy (in what order to 'move' one image relative to another to better align the images); and (4) the similarity metric (the measure of how closely the images are aligned).

Conventional registration systems often use features. By using the features in an image, the whole image does not have to be used for alignment. Instead, significant details, for example, edges of objects in the image can be extracted and aligned. The feature space defines the features which are extracted. Depending on the application, using features for registration is robust. However, registration using features requires prior knowledge about what kind of image can be expected so that the important features will be included in the feature space. In addition, if the features can not be detected reliably, special features (markers), may have to be added to the objects or to the images in order to provide reliable registration. Also, in many applications, the images to be registered are dissimilar, that is, the features are not quite the same. These dissimilarities can, for example, be caused by: changes between exposures in the depicted object; or use of different sensors to obtained images, for example, images captured from the red chip and the green chip in a 3-chip CCD (charge-coupled device) camera or images captured from sensors responding to infrared light and visible light.

The search space defines what kind of geometric transformations can be used to align the images. Examples of geometric transformations include: (1) translation (shifting); (2) rotation, and (3) relative magnification.

The search strategy is used to identify (often iteratively) the parameters of the geometric transformation required to align the images. Typically, the search strategy optimizes a similarity metric, that is, a measure of the similarity between images. If the similarity metric measures differences between images, the desired geometric transformation can be obtained by minimizing the measure. Similarly, if the similarity metric measures the sameness of images, the desired geometric transformation can be obtained by maximizing the measure. Some similarity metrics are calculated using: (1) correlation, that is, the summing of those portions from one image which are the same or similar to the corresponding portion of the other image after the portions have been normalized, weighted, statistically adjusted, or phase adjusted; (2) summing of absolute differences of: the intensity of portions of the images, contours in the images, or surfaces in the images; (3) matched filters (similar to correlation); and/or (4) summing of sign changes between portions of a difference image, that is, for example, the resulting image when one image is subtracted pixel-wise from the another image.

However, without feature extraction, only the 'summing of sign changes' (sign summing) has been found to be especially useful for dissimilar images. The other similarity metrics: (1) are sensitive to the dissimilarities; (2) require features; (3) are sensitive to noise; and/or (4) are sensitive not only to dissimilarities but also to changes in illumination of the object. Some implementations of sign summing can take advantage of a characteristic of certain noise distributions in certain images wherein the number of sign changes in a pointwise intensity difference image have a maximum when the images are perfectly aligned, but such implementations require knowledge about the type of noise distribution. Also, if the noise distribution is modified (to fit within certain parameters for sign summing), the speed of the registration can be relatively slow.

SUMMARY OF THE INVENTION

This invention relates to systems (devices and procedures) for solving the problem of feature-free registration of dissimilar images by maximizing a new measure of similarity, that is, a measurement of the sharpness of the focus of the composite image. The maximization is performed by transforming ('moving') one image relative to another image until the sharpest focus for the composite image is achieved.

An important aspect of this invention is that no features are calculated. In other words, all of the pixels of the chosen images are used. Accordingly, no knowledge about any feature is needed and the system can be applied generally. In addition, by not requiring features, quick iterations using the whole images can be performed and the system is statistically more efficient since all available information is used.

One goal of this invention is to apply image content autofocusing technology to the field of image registration.

An object of this invention is to provide a system for obtaining registration information to align a reference image with an unregistered image having the steps of: combining the reference image and the unregistered image to generate a composite image; and determining alignment parameters for at least one of the reference image or the unregistered image from the composite image, the alignment parameters selected to correspond to a focus or optimal focus for the composite image. The system can also include the steps of: determining an energy level from the composite image; and selecting the alignment parameters in accordance with the energy level. In addition,the system can also include the steps of: filtering the composite image using a focus filter to generate a filtered image; determining an energy level from the composite image; and selecting the alignment parameters in accordance with the energy level. The focus filter can be a Wiener filter, a modified second order difference filter, and a bandpass filter.

Another object of this invention is to provide a system for aligning a reference image with an unregistered image having: a transformer for receiving the unregistered image and a transformation, and for generating a transformed image; a compositor for combining the reference image and the transformed image to generate a composite image; an energy calculator for receiving the composite image and for determining an energy level of the composite image; and a transformation generator for receiving the energy level and for generating the transformation in accordance with the energy level such that the transformation is selected to correspond to a focus for the composite image. The transformation generator can include a maximizer for determining which parameters for the transformation result in an optimal focus. The transformer can include an interpolator for increasing resolution of parameters of the transformation. The system can also include a filter calculator for modifying the composite image such that the noise of the composite image has been reduced, the noise being reduced by increasing energy contributions from selected parts of the composite image which contribute a relatively larger proportion of alignment information than noise, and by decreasing energy contributions from other parts of the composite image which contribute a relatively larger proportion to noise than to alignment information. The filter calculator can include a convoluter; and a filter selected from the group consisting of: a Wiener filter, a modified second order difference filter, and a bandpass filter. The filter calculator can be limited to: (1) only operate on the composite image in a single direction; and/or (2) operate on selected sections of the composite image. Also, each filter of the group of modified second order difference filters can have a first negative value, one or more first zero values, a positive value, one or more second zero values, and a second negative value, and can be a linear array. Optionally, the system can have a display for displaying one or more of: the reference image, the unregistered image, the transformed image, the composite image, and the filtered image.

In addition, the system can include a filter generator for determining filter characteristics of a filter for use in the filter calculator, the filter generator having: (a) a frequency spectrum generator for receiving composite images and for generating image frequency spectra; and a filter optimizer for determining from the image frequency spectra those filter characteristics which maximize the signal-to-noise ratio of at least a portion of the composite images, and/or (b) a modified second order difference filter generator for selecting a modified second order difference filter from a group of modified second order difference filters by selecting the modified second order difference filter which yields a maximum ratio of peak energy level to peak energy width for a plurality of composite images.

Another object of this invention is to provide a system for aligning a reference image with an unregistered image having the steps of: transforming the unregistered image with a transformation to generate a transformed image; combining the reference image and the transformed image to generate a composite image; determining an energy level of the composite image; and generating the transformation in accordance with the energy level such that the transformation is selected to correspond to a focus or optimal focus for the composite image. The transforming step can also include the step of interpolating the unregistered image to allow increased resolution for parameters of the transformation. In addition, the system can include the step of filtering the composite image such that noise in the composite image is reduced, the noise being reduced by increasing energy contributions from selected parts of the composite image which contribute a relatively larger proportion of alignment information than noise, and by decreasing energy contributions from other parts of the composite image which contribute a relatively larger proportion to noise than alignment information. This filtering step can include the step of convoluting the composite image with a filter selected from the group consisting of: a Wiener filter, a modified second order difference filter, and a bandpass filter. The filtering step can be limited to operate on the composite image in a single direction; and/or operate on selected portions of the composite image. Also, each filter of the group of modified second order difference filters can have a first negative value, one or more first zero values, a positive value, one or more second zero values, and a second negative value, and can be linear array.

In addition, the system can include the steps of generating a filter from frequency spectra of one or more composite images; and optimizing the filter by selecting those filter characteristics which maximize the signal-to-noise ratio of at least a portion of the composite images; and/or generating a modified second order difference filter by selecting the modified second order difference filter from a group of modified second order difference filters which yields a maximum ratio of peak energy level to peak energy width for a plurality of composite images.

These objects and other objects, advantages, and features of the invention will become apparent to those skilled in the art upon consideration of the following description of the invention.

BRIEF DESCRIPTION OF THE DRAWINGS

FIG. 3A is the red component, FIG. 3B is the green component, and FIG. 3C is also a green component, as in FIG. 3B, but modified to remove a number of features;

FIGS. 4A, 4B, 4C, 4D, and 4E are graphs of the frequency domain illustrating alignment (FIG. 4A), two pixel misalignment (FIG. 4B, 4D), and four pixel misalignment (FIG. 4C, 4E), of the images of FIGS. 3A and 3B;

FIGS. 6A, 6B, 6C, and 6D are graphs illustrating the similarity metric measured for various transformations (movement) of one image with respect to another image according to one embodiment of the invention; FIGS. 6A and 6B illustrate the similarity metric for the composite image formed from FIGS. 3A and 3B, and FIGS. 6C and 6D illustrate the similarity metric for the composite image formed from the composite image of FIGS. 3A and 3C.

DETAILED DESCRIPTION OF THE PREFERRED EMBODIMENT

Figure 1:
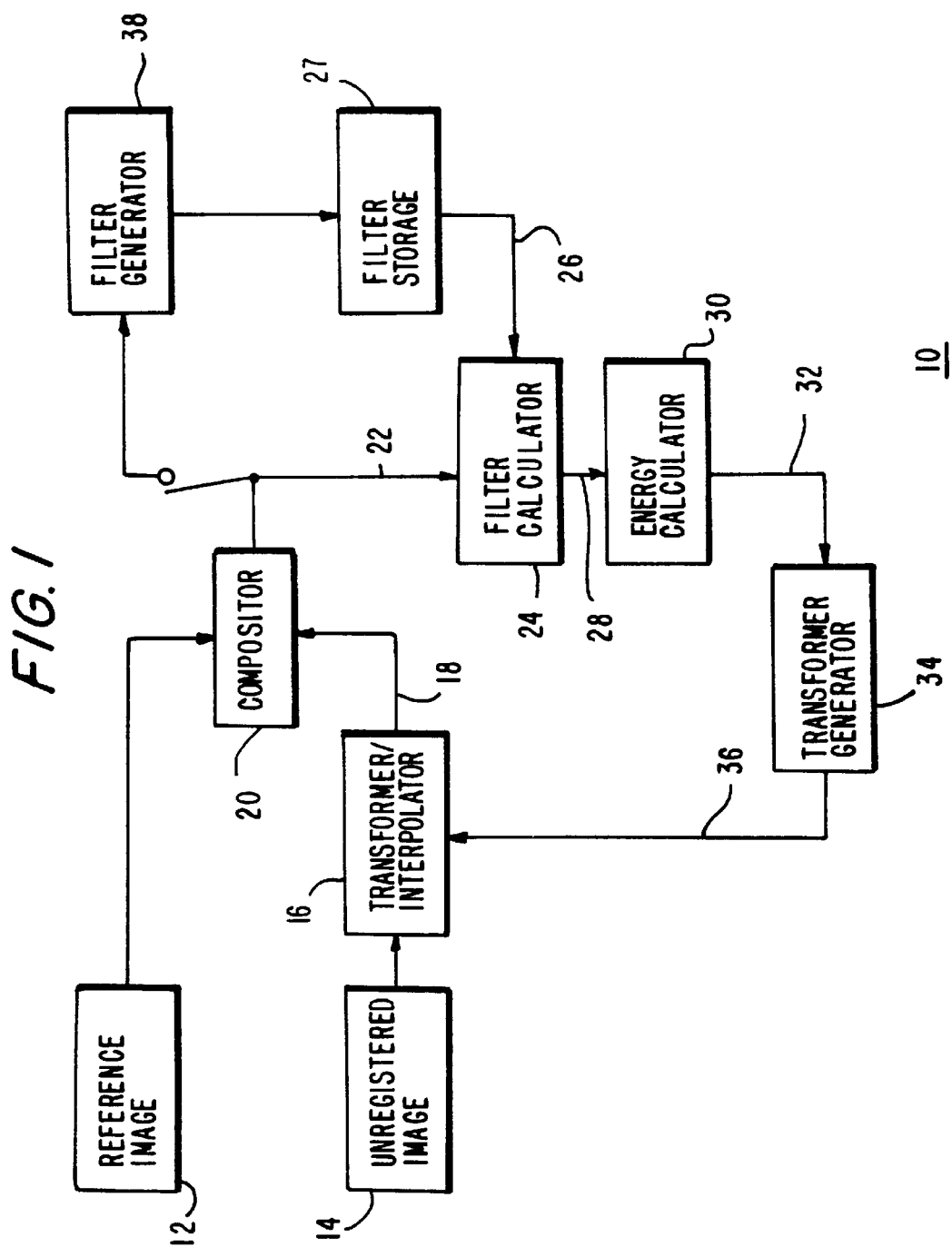
FIG. 1 is a block diagram illustrating one embodiment of the invention.

FIG. 1 is a block diagram illustrating an image registration system 10 according to one embodiment of the invention. The image registration system 10 receives two images, reference image 12 and unregistered image 14. In one embodiment, the images are formed as an array of pixels, but other image representations can also be used. The unregistered image 14 is transformed (shifted/rotated) by a transformer 16 to generate a transformed image 18. The reference image 12 and the transformed image 18 are combined in compositor 20 which generates a composite image 22. In one embodiment, the compositor 20 performs a pixel-wise addition, that is, each pixel of the reference image 12 is added to the corresponding pixel in the transformed image 18. However, other types of addition (including addition with weighting) or image combining can be used. Also, the reference image 12, in one embodiment, is selected such that area of the reference image 12 will be small enough to be overlapped by the unregistered image 14 and any of the transformed images 18 derived from the unregistered image 14. The composite image 22 is applied to a filter calculator 24 which uses a filter 26 (which can be stored in filter storage 27), to generate a filtered image 28. The filtered image 28 is applied to energy calculator 30 which calculates an energy level 32 for the filtered image 28. The energy level 32 is then applied to a transformation generator 34 which, based on the energy level 32, generates a transformation 36 by selecting transformation parameters. This transformation 36 is then applied in transformer 16 to the unregistered image 14. Alternatively, the reference image 12 could be transformed, or both images 12, 14 could be transformed.

The transformation generator 34 operates to select the transformation 36 which will yield the maximum energy level 32. According to one embodiment of the invention, if the filter 26 applied to the composite image 22 is of the type used to determine the optimal focus of an objective lens with respect to an object, the maximum energy level 32 will occur when the composite image is most 'sharply focused' which corresponds to when the reference image 12 and transformed image 18 are aligned. In other words, the ability to use such a filter arises because an out-of-focus image is not unlike two misaligned images of the same object. In still other words, the filter calculator 24 and the energy calculator 30 provide a similarity metric for comparing two images from a single combined image which also can be used to bring an image into focus.

In one embodiment of the invention, the transformer 16 includes an interpolator (not shown). The interpolator further modifies the unregistered image 14 to increase the effective number of pixels. By increasing the effective number of pixels, sub-pixel transformations can be performed by, for example, shifting the unregistered image 14 to the right by 3.25 pixels. Accordingly, a more precise registration can be obtained. The interpolator applies a B-spline interpolation, but other types of interpolation can be used, for example, bilinear interpolation. Also, to improve the interpolation results, one embodiment of the invention employs floating point arithmetic.

The transformation generator 34 can maximize the energy 32 by optimizing the transformation 36 using a search strategy. A useful strategy is to optimize each parameter of the transformation independently. In one embodiment of the invention, the transformation parameters are: (1) translation in the x-direction; (2) translation in the y-direction; and (3) rotation about the origin. However, as discussed below additional parameters, such as magnification can be included. In this embodiment, the following search strategy is employed to maximize the energy level 32:

(1) select the center of composite image 22 as the origin of the x-axis and y-axis; then
(2) search in the x direction to maximize the energy level 32, a typical step size can be 1 pixel; then
(3) search in the y direction to further maximize the energy level 32, a typical step size can be 1 pixel; then
(4) search in the rotation direction to further maximize the energy level 32, a typical step size is 0.5 degrees; then, optionally,
(5) search for the appropriate relative magnification of the images to further maximize the energy level 32.

Preferably translation is done before rotation because once the translation (x,y) is known at least the center pixels are aligned whereas if the translation is not aligned, the rotation will not be able to properly align any pixels.

Because the similarity metric can also focus an image, the registration system 10 provides the additional ability to improve the focus of the source of the reference image 12 and/or unregistered image 14, provided that a focusing controller/mechanism is provided with the appropriate signals from the registration system 10.

If interpolation is used, the interpolation can be employed once two of the transformation parameters are maximized. In the search strategy above, interpolation of the unregistered image 14 should be performed after step 3. Also, some predictive search strategies require interpolation. For example, using differentiation with respect to the transformation parameters can aid in predicting where the maximum energy level is located, but such differentiation usually requires that the unregistered image be interpolated.

A variation on the search strategy above, is to gradually maximize each of the transformation parameters by employing the search strategy iteratively, that is, one or more times to gradually refine the optimization. Using this variation in one experiment with microscope images, magnification which was incorrect by 1 percent and rotation which was incorrect by 5 degrees, still achieved a registration incorrect by only one pixel with a coarse optimization.

As indicated above, the selection of the filter 26 for the image registration system 10 is an important aspect of this invention. Filter 26 is selected to enhance those spatial image frequencies of the composite image 22 that have a high ratio of alignment energy with respect to noise energy. Like a filter employed to move an objective lens to an optimal focus which particularly emphasizes, for example by amplifying, those spatial image frequencies which contain optimal focus information, the registration filters 26 of this invention are selected to particularly emphasize those spatial image frequencies which contain perfect alignment information. Also, filter calculator 24 in combination with energy calculator 30 responds to changes in the composite image 22, but at the same time is not sensitive to noise, for example, dark current noise in the camera which obtained the images 12, 14 or noise in the amplifiers/analog-to-digital converters.

In one embodiment of the invention, the filter calculator 24 filters the composite image 22, which can be mathematically represented by a function $f(x,y,\Theta)$ by linearly convolving the filter 26, which can be represented by a function, $g(y)$, with rows of the composite image 22 to generate the filtered image 28, which can be mathematically represented by a function, $h(x,y,\Theta)$. Equation 1 and Equation 2 below mathematically represent this operation for the spatial domain and the frequency domain, respectively.

$$h(x, y, \Theta) = f(x, y, \Theta) * g(y) = \sum_i f(x, y - i, \Theta) \cdot g(i) \quad \text{Equation 1}$$

$$H(x,v,\Theta) = F(x,v,\Theta) \cdot G(v) \quad \text{Equation 2}$$

Figure 2:
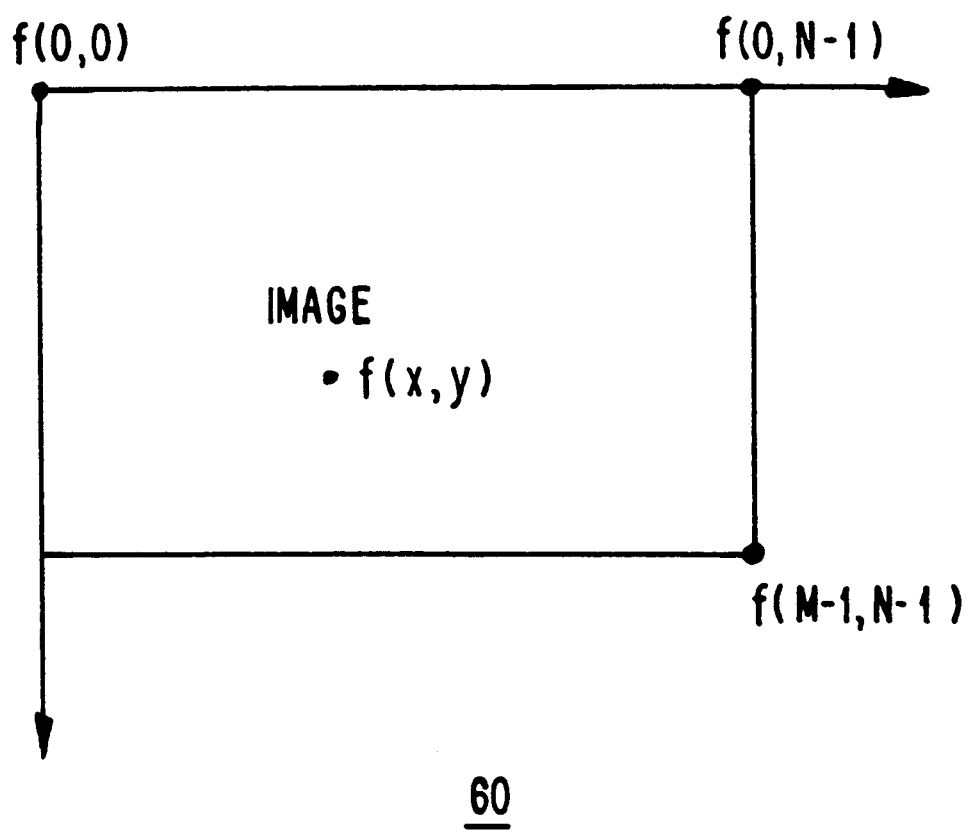
FIG. 2 illustrates a coordinate representation of an image according to one embodiment of the invention.

Note that the filter 26 is only dependent upon the y-direction of a coordinate system 60, see FIG. 2. Accordingly, the Fourier transform of the raw image, F(x, v,θ), is only performed in the y-direction. The resulting Fourier transform is then still a function of the spatial parameter x and vector transformation parameter θ. Also, because of the length of the filter 26, the edges of the composite image 22 in the y-direction will not be included in the filtered image 28. However, because the edges of the image usually contain only a peripheral (less important) information, this truncation does not adversely affect the operation of this image registration system.

The energy calculator 30 calculates the energy level 32, P(z), of the filtered image 28, and is mathematically described below in Equation 3.

$$P(z) = \sum_x \sum_y (h(x, y, \Theta))^2 \qquad \text{Equation 3}$$

One task of the filter 26 is to maximize the signal-to-noise ratio, 'SNR', of the composite image 22, that is, to maximize the ratio of the signal (alignment information) with respect to the noise which does not contain alignment information. Each image 12, 14 contains both image content information, $f_0(x,y,\theta)$, and noise, $n(x,y,\omega)$. The variable 'ω' indicates that noise in an image varies each time an image is obtained. When these images are combined to produce composite image 22, composite image 22 will contain, θ-dependent alignment energy, and θ-independent noise energy, as indicated mathematically below in Equation 4 and Equation 5 for the spatial domain and frequency domain, respectively.

$$f(x,y,\Theta)=f_0(x,y,\Theta)+n(x,y,\omega) \qquad \text{Equation 4}$$

$$F(x,v,\Theta)=F_0(x,v,\Theta)+N(x,v,\omega) \qquad \text{Equation 5}$$

Figure 3A:
FIGS. 3A, 3B and 3C are images of separate colour components obtained from a 3-chip video camera of a May-Grünwald-Giemsa (MGG) stained white blood cell.
Figure 3B:
Figure 3C:
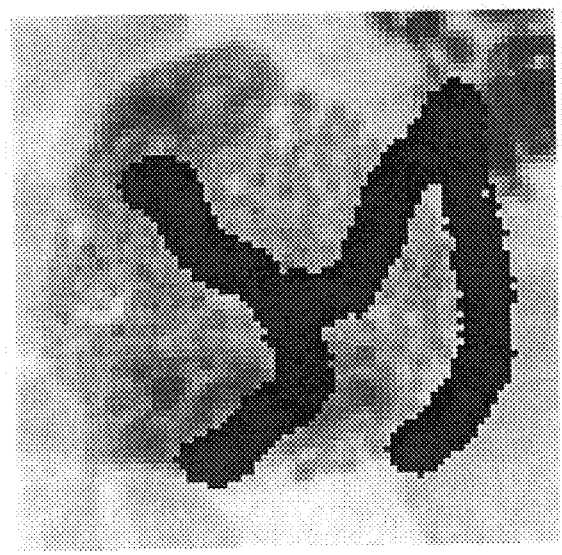
Figure 5B:
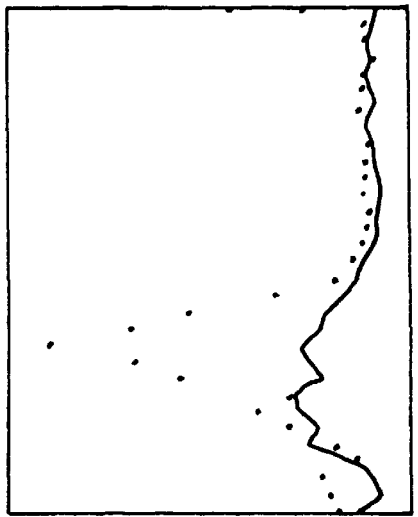
FIGS. 5A, 5B, 5C, and 5D are graphs of the frequency domain illustrating the effect of the modified filter (dots) according to one embodiment of the invention on the misalignment information from FIGS. 4B, 4C, 4D, and 4E, respectively.
Figure 5D:
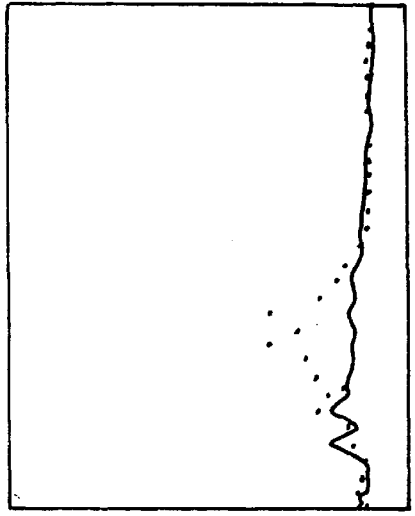
Figure 5A:
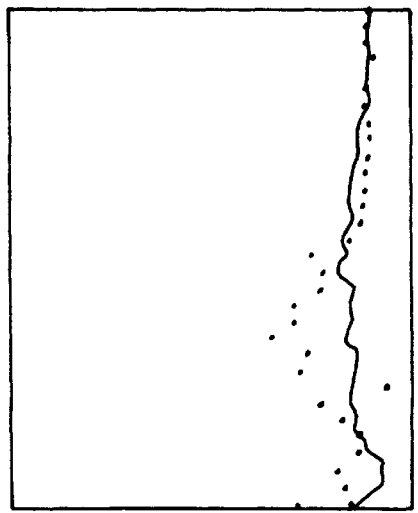
Figure 5C:
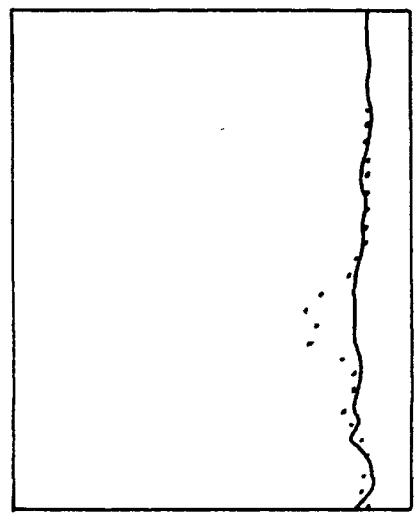

FIGS. 3A, 3B and 3C were studied at various alignments in accordance with one embodiment of the invention. FIG. 3A is the reference image 12, FIG. 3B is an unregistered image 14 having the same features as FIG. 3A, and FIG. 3C is an unregistered image 14 lacking many of the features of FIG. 3A.

FIGS. 4A, 4B, 4C, 4D, and 4E are representations of composite images 22 presented as one-dimensional Fourier transforms. FIG. 4A is the row-wise (y-direction) Fourier transform of the composite image 22 of FIGS. 3A and 3B when perfectly aligned. FIG. 4A is plotted as the logarithm of the magnitude (response) of the Fourier transforms versus frequency. FIG. 4B is the difference of the row-wise Fourier transforms of two different composite images 22, that is, the composite image of FIG. 3A perfectly aligned with FIG. 3B, and the composite image 22 of FIG. 3A misaligned with FIG. 3B by 2 pixels in the y-direction. FIG. 4B is plotted as the difference in magnitude (response) of the Fourier transforms versus frequency. As shown in FIG. 4B, the misregistration mainly affects middle frequencies. FIG. 4C is similar to FIG. 4B except that FIGS. 3A and 3B were misaligned by 4 pixels. In FIG. 4C, the misregistration mainly affects the lower frequencies.

In an embodiment of the invention for microscope images, the unregistered image 14 usually needs to be shifted with respect to the reference image 12 by about 2 pixels. Accordingly, the misalignment information appears primarily in the middle frequencies of the filtered image 28, see FIG. 4B. Thus, the filter 22 for such a microscope embodiment should be selected to amplify (emphasize) the middle frequencies.

FIGS. 4D and 4E are similar to FIGS. 4B and 4C except these figures present column-wise (x-direction) Fourier transforms of the same composite images 22 used for FIGS. 4B and 4C, respectively, that is, composite images having misalignment in the y-direction. FIGS. 4D and 4E demonstrate that the alignment information obtained from the one-dimensional Fourier transforms is not as strong when the misalignment is perpendicular to the filtering direction.

FIGS. 5A, 5B, 5C, and 5D illustrate the amplification available when using a well-selected filter 22. The solid lines in these figures correspond to the representations in FIGS. 4B, 4C, 4D, and 4E, respectively. The dotted lines represent the corresponding filtered images 28 in same frequency domain.

Figure 6A:
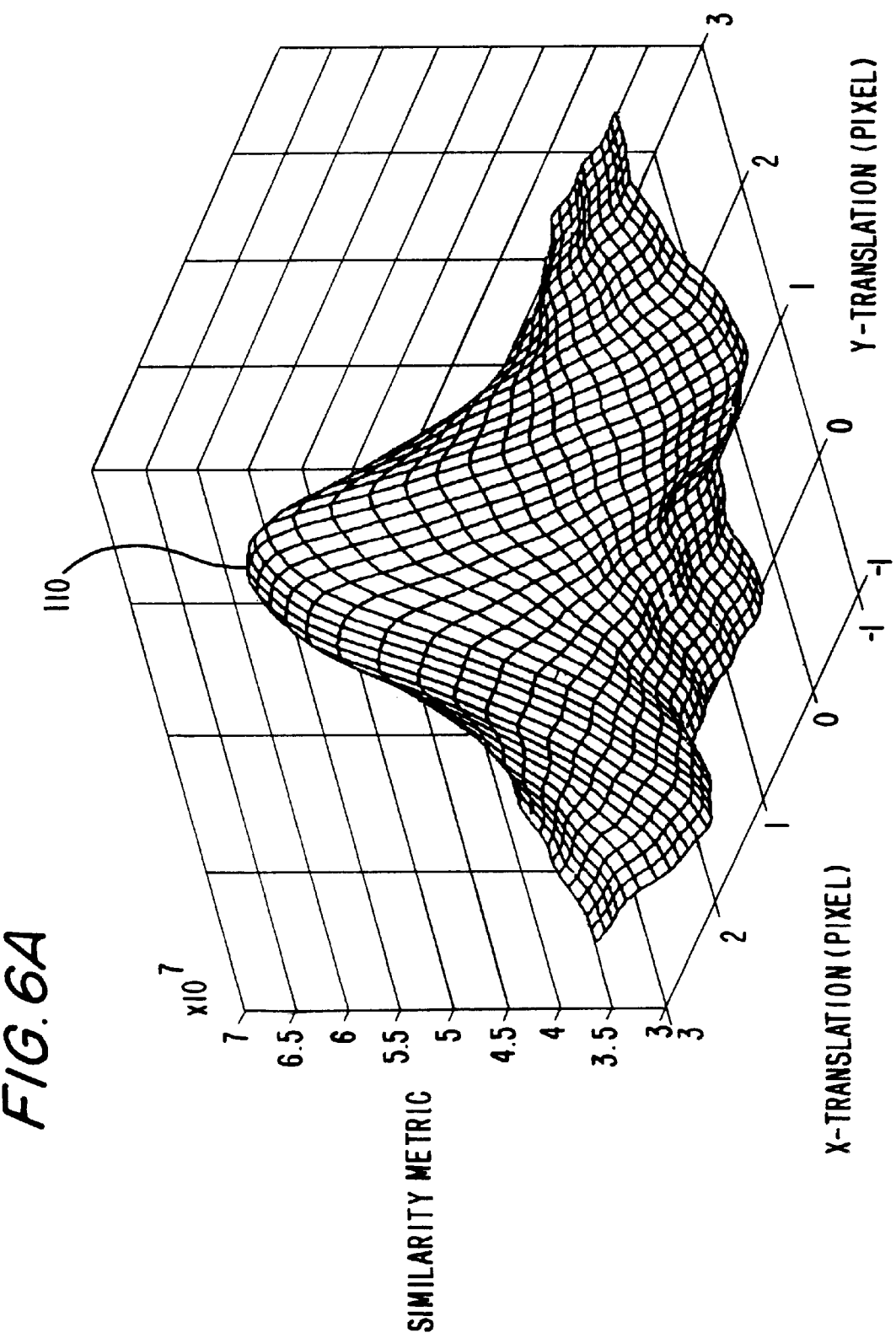
Figure 6C:
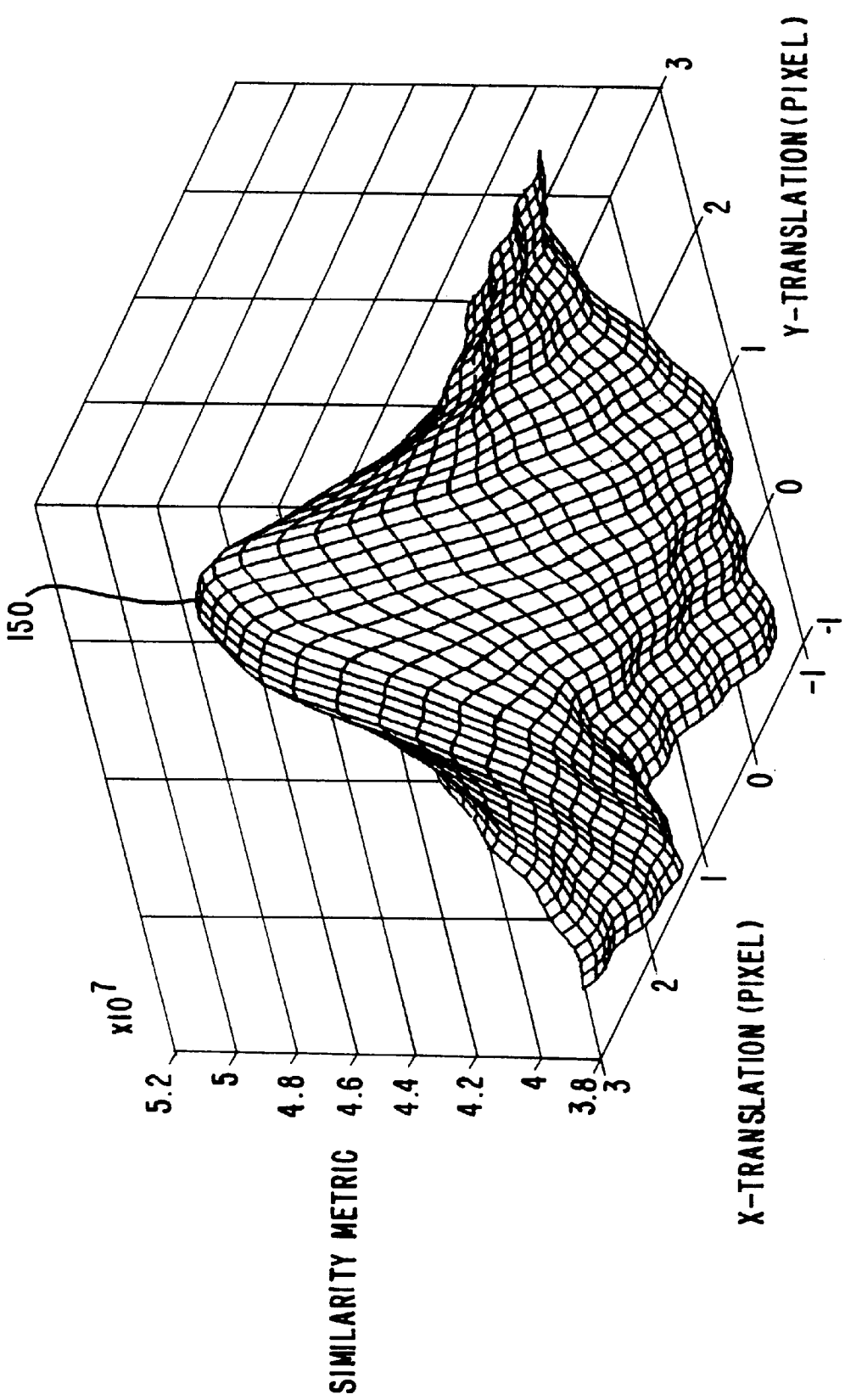
Figure 6D:
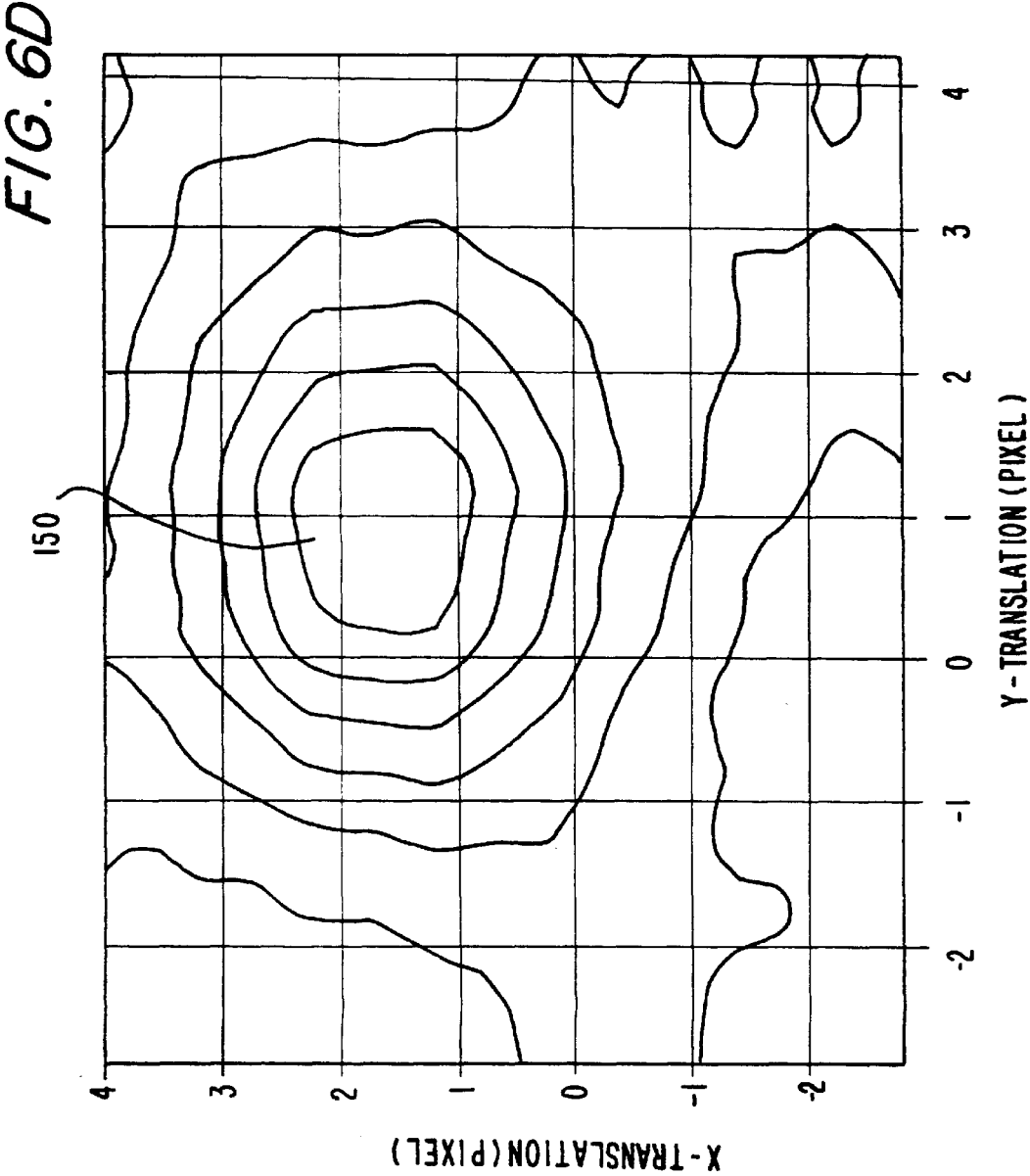

The correlation between details in the two images 12, 14 can be low, that is, the details in the two images can vary as long as the images have at least some details of in common. FIGS. 6A and 6B illustrate in three-dimensions and two-dimensions, respectively, the location of the maximum energy level 110 for the composite image 22 of FIGS. 3A and 3B, that is, perfect alignment. Similarly, FIGS. 6C and 6D illustrate in three-dimensions and two-dimensions, respectively, the location of the maximum energy level 150 for the composite image 22 of FIGS. 3A and 3C, that is, perfect alignment. Even though FIG. 3C lacks significant details found in FIG. 3B, virtually no change in the location of the maximum energy level is found indicating the robustness of the image registration system 10 of this invention. Similarly, if part of one image is obscured, thereby covering some features, the maximum energy level will also not vary significantly.

Further, the similarity metric provided by compositor 20, filter calculator 24, and energy calculator 30 of this invention does not punish dissimilarities between images 12, 14 arising from, for example, different lighting conditions when each image is captured, but instead emphasizes any similarities including edges and common patterns.

To generate a filter 26 according to this invention, that is, a filter which enhances the alignment information in a composite image 22 of a reference image 12 and an unregistered image 14, at least two transformations 36, $\theta_1$ and $\theta_2$ which are the transformations for an expected perfect alignment and another transformation which is partly misregistered, respectively, are selected. For the two transformations 36, the involved composite images 22 can be represented as $f(x,y,\theta_1)$ and $f(x,y,\theta_2)$, respectively, or for one row, $x_0$, for example:

$$f(x_0,y,\Theta_1)=f_0(x_0,y,\Theta_1)+n(x_0,y,\omega_1) \qquad \text{Equation 6}$$

$$J(x_0,y,\Theta_2)=f_0(x_0,y,\Theta_2)+n(x_0,y,\omega_2) \qquad \text{Equation 7}$$

Therefore, the corresponding filtered outputs, $h(x,y,\theta_1)$ and $h(x,y,\theta_2)$, are, for the same row:

$$h(x_0,y,\Theta_1)=f_0(x_0,y,\Theta_1)*g(y)+n(x_0,y,\omega_1)*g(y) \qquad \text{Equation 8}$$

$$h(x_0,y,\Theta_2)=f_0(x_0,y,\Theta_2)*g(y)+n(x_0,y,\omega_2)*g(y) \qquad \text{Equation 9}$$

According to different embodiments of the invention, the following filters can be used:

(1) an optimal, linear filter (Wiener filter);
(2) a bandpass filter; and
(3) a modified second order difference filter.

Each of these filters, g(y), is chosen to enhance the difference in the alignment information (difference information) obtained from these selected composite images 22 by maximizing the signal-to-noise ratio. The difference information, in one embodiment, is obtained from a difference in the noise-free image content of two composite images 22, for example, $$\sum_x \sum_y (f(x, y, \Theta_1))^2 - \sum_x \sum_y (f(x, y, \Theta_2))^2.$$

An additional example of difference information is $$\sum_x \sum_y |\hat{f}(x, y, \Theta_1)| - \sum_x \sum_y |\hat{f}(x, y, \Theta_2)|,$$

where $\hat{f}(x,y,\Theta)$ is the zero mean version of $f(x,y,\Theta)$, that is, the mean value of composite image 22 subtracted from each element of the composite image. The signal-to-noise ratio is considered by dividing the difference information energy by the sum of the unwanted energies, such as noise energy, from the corresponding filtered images 28. Equation 10 is a mathematical representation showing a signal-to-noise ratio of image energies using one row from the composite images 22, each having a different transformation, that is, $\theta_1$ and $\theta_2$ $$SNR = \frac{E(f_0(x_0, y, \Theta_1)^2 - f_0(x_0, y, \Theta_2)^2)}{E((h(x_0, y, \Theta_1) - f_0(x_0, y, \Theta_1))^2) + E((h(x_0, y, \Theta_2) - f_0(x_0, y, \Theta_2))^2)} \quad \text{Equation 10}$$

where E is the expected value (as determined from probability), which in one embodiment of the invention is an energy level.

Since the noise does not affect the difference information energy of the numerator, maximizing the SNR is equivalent to finding a filter 26 that minimizes the denominator. Assuming that the θ-dependent alignment energy and the noise energy of the composite images 22 are uncorrelated, the energy in the denominator, D(g), can be expressed in Equation 11 as a sum over all frequencies of functions of discrete Fourier transforms and spectral densities:

$$D(g) = \Sigma[|G(v)-1|^2 R_S(v) + |G(v)|^2 R_N(v)] \quad \text{Equation 11}$$

the spectral densities being defined as the squared absolute value of the discrete Fourier transform:

$$R_s(v) = R_{f_0,\Theta_1}(v) - R_{f_0,\Theta_2}(v) \quad \text{Equation 12}$$

$$R_N(v) = R_{n_{\omega_0}}(v) + R_{n_{\omega_1}}(v) = 2 \cdot R_n(v) \quad \text{Equation 13}$$

In other words, the filter 26 emphasizes the registration-dependent image energy from the composite image 22 by amplifying the alignment information energy. In so doing, the filter 26 also emphasizes some of the noise energy present in the composite image 22. However, the filter 26 is chosen to minimize the amount of noise energy in energy level 42 by damping the overall noise energy.

Since all the terms in D(g) are positive, the sum can be minimized by minimizing each of the terms independently.

Following standard, although continuous signal, Wiener filter theory, the discrete Fourier transform of the optimum filter is:

$$G(v) = \frac{R_S(v)}{R_S(v) + R_N(v)} = \frac{R_{f_0,\Theta_1}(v) - R_{f_0,\Theta_2}(v)}{R_{f_0,\Theta_1}(v) - R_{f_0,\Theta_2}(v) + 2 \cdot R_n(v)} \quad \text{Equation 14}$$

One interpretation of this filter is that the amplification is close to one at frequencies where the alignment energy of the composite images 22 is much stronger than the noise energy and close to zero where the noise energy is much stronger than the alignment energy. By obtaining the discrete inverse Fourier transform of this optimal filter, G(v), the optimal filter, g(y), can be calculated. This optimal filter is a Wiener filter, and because one row of a composite image 22 can be filtered independently of adjoining rows, each row of a composite image 22 can be filtered as soon as the row is generated.

Wiener filters, however, typically require time-consuming calculations, for example, in filter generator 38, Fourier transforms, and in filter calculator 24, complicated calculations. Also, Wiener filters can be sensitive to tolerances in a system. For example, in microscopy, the frequency spectrum of an object changes over time as other objects move into or out of the field of view.

Another possible filter is a bandpass filter selected to emphasize or amplify those frequencies of a composite image 22 containing the greatest amount of alignment energy with respect to noise energy. This bandpass filter can be determined from frequency spectra like that shown in FIG. 4B, or, more simply, by trial and error of various bandpass filter frequencies. However, while bandpass filters are relative simple to implement in hardware, implementation of a bandpass filter in software can be complex as well as time-consuming.

Figure 7A:
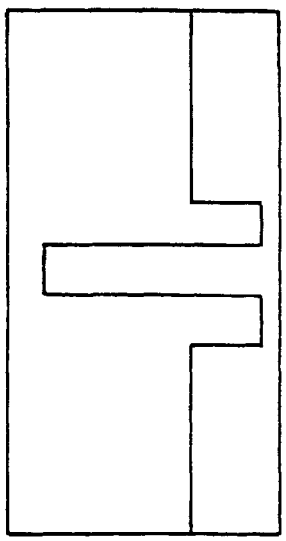
FIGS. 7A, 7B, 7C, 7D, 7E, and 7F are graphs that illustrate various filters in the time domain, and the frequency domain (Fourier transforms) according to embodiments of the invention.

Another possible filter according to one embodiment of the invention, is a modified second order difference filter ("modified filter"). In the frequency domain, such a filter has the appearance of a sinusoidal wave form, see for example, FIG. 7E. FIGS. 7A and 7D illustrate an ordinary second order difference filter. This second order difference filter can be implemented in software as a one row by three column array of [−1, 2, −1 ], as shown in FIG. 7A. However, the frequency distribution of this filter, as shown in FIG. 7D, emphasizes the higher frequencies over the lower frequencies whereas the image alignment information concerning misregistration is concentrated at the lower or middle frequencies, see for example, FIGS. 4B and 4C.

Figure 7B:
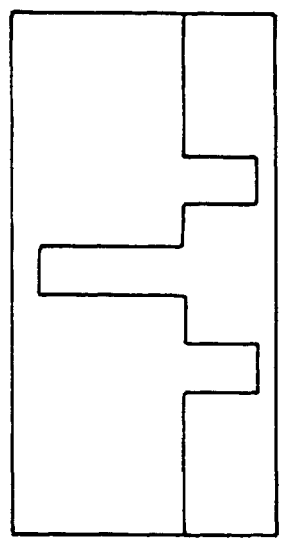
Figure 7C:
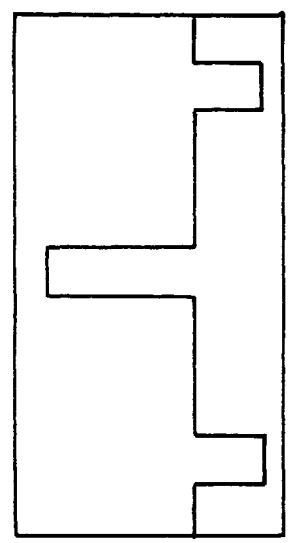
Figure 7D:
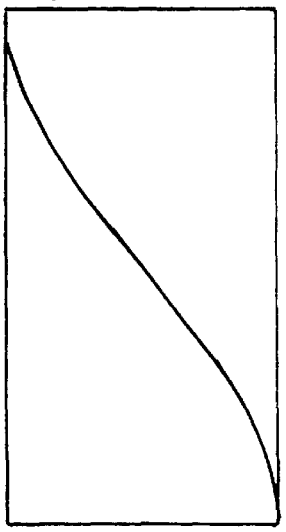
Figure 7E:
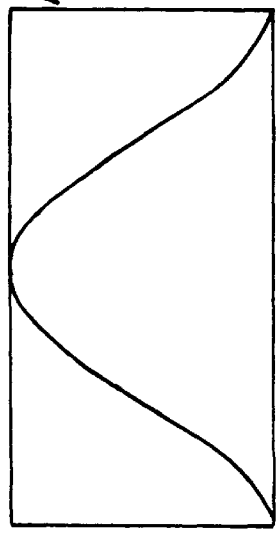
Figure 7F:
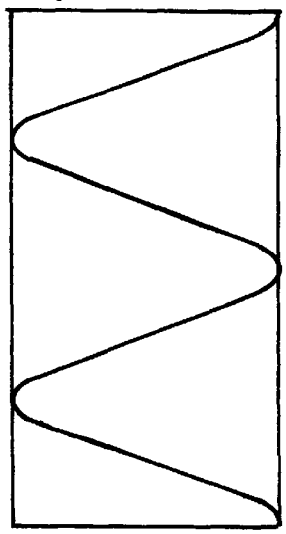

FIGS. 7B, 7C, 7E, and 7F, illustrate modified second order difference filters according to an embodiment of this invention which can be implemented in software almost as simply as the second order difference filter. The modification consists of adding internal zeros in the filter as shown in FIGS. 7B (one zero) and 7C (three zeros). The frequency distributions are shown in FIGS. 7E and 7F, respectively. As compared to FIG. 7D, the modified filter shown in FIG. 7E enhances the middle frequencies, and the modified filter shown in FIG. 7F enhances the lower frequencies and some of the higher frequencies. However, because the higher frequencies only contain lower energy noise, the amplified lower frequencies more than compensate for this amplification of the higher frequencies.

Other modified filters can be created by inserting additional zeros into the filter. Thus, the frequency distribution of the modified filter can be tuned to composite images 22 by changing the number of consecutive zeros in the discrete filter. This tuning, that is, filter generation by modified filter generator 38 can be performed, for example: (1) by trial and error with an operator determining which modified filter produces the best aligned images; (2) by obtaining frequency spectra and selecting where to place the sinusoidal minimum(s); or (3) mathematically, by modifying the maximization of the SNR performed in Equation 14 (in the modified maximization technique, however, the filter spectrum G(f) is restricted to the class of modified second order difference filters).

One advantage of the modified filter is the relatively simple implementation of the transformation generator 38 in software because only one parameter, the number of internal zeros, is adjusted. Despite this simplicity, the modified filter, once selected, is also robust in quickly generating the filtered image 28 which is used to rapidly arrive at perfect alignment.

Because of the robustness of the modified filter, a non-integer number of zeros is not required. Nevertheless, should an embodiment employing a non-integer number of zeros be needed, such a modified filter can be implemented by changing the pixel size.

Other considerations concerning filter selection are discussed below.

In many situations, the composite image 22 has an excess of alignment information in the desired part of the image, for example, many more rows than required. In such a situation, not all of the lines (rows) need to be processed by the filter calculator 24 and energy calculator 30, and fewer lines to process, allows for quicker calculations. Indeed, in one embodiment of the invention having 100 rows, good registration was achieved by using only every fifth row. Similarly, if a only a coarse adjustment is desired, fewer rows can be processed by the filter calculator 24.

While this invention has been described in terms of filtering in one direction, in particular, horizontal filtering of the composite image 22. Filtering in other directions may be preferable in some situations. For examples, composite images 22, containing horizontal lines, require vertical filtering, or a combination of vertical and horizontal filtering, for registration. Either of these other types of filtering can be added, for example, after the squaring in the energy calculation. Although combined filtering is more computationally complex, more of the alignment information from the composite image 22 is utilized.

For the highest performance, the filter 22 should be adjusted according to: (1) the kind of transformation parameters being used; and (2) how far from the optimum the registration is typically started. Such adjustments can be implemented using the SNR maximization technique discussed above. Notwithstanding, the modified second order difference filter is sufficiently robust to operate even with different types and magnitudes of misregistration. Nevertheless, the simiplicity of the modified filter recommends the modified filter should a dynamic adaptive filter be required.

As described above, this invention does not require features for registration and also presents a new robust similarity metric which is not restricted to any particular search spaces or search techniques. More specifically, the search space includes all kinds of transformations, including translation, rotation and magnification. However, this invention also encompasses more complicated transformations such as three-dimensional (3-D) registration and/or local transformations.

One application for which this invention is particularly suited is registration of different colour components for a 3 chip video camera even when the pattern variations have not been corrected.

For the simplicity of the equations in the above description, the filtering of the images is described as being row-wise. However, other filtering techniques, such a column-wise, or row-wise and column-wise filtering, can be used with this invention. Also, in one embodiment of the invention, no filtering is performed, that is, the composite image 22 is provided to energy calculator 30.

Although this invention has been described in terms of images, the description should be construed to include image signals which represent such images. Further, this invention encompasses implementations in both hardware and software.

While this invention has been described in terms of specific embodiments, this invention, including this disclosure and appended claims, is not so limited and is to be construed in accordance with the full spirit and scope of the invention including alternatives and modifications made apparent to those of skill in the art.

We claim:

1. A method for obtaining registration information to align a reference image with an unregistered image comprising the steps of:
   combining the reference image and the unregistered image to generate a composite image;
   determining a focus measure for the composite image; and
   determining alignment parameters for at least one of the reference image or the unregistered image from the focus measure for the composite image, the alignment parameters selected to correspond to a focus for the composite image.

2. A method according to claim 1, wherein the alignment parameters are selected to achieve an optimal value of the focus measure.

3. A method according to claim 1, wherein the step of determining the focus measure further comprises the steps of:
   determining an energy level from the composite image as a focus measure.

4. A method according to claim 1, wherein the step of determining the focus measure further comprises the steps of:
   filtering the composite image using a focus filter to generate a filtered image;
   determining an energy level from the filtered image as a focus measure.

5. A method according to claim 4, wherein the focus filter is selected from the group consisting of: a Wiener filter, a modified second order difference filter, and a bandpass filter.

6. A device for aligning a reference image with an unregistered image comprising:
   a transformer for receiving the unregistered image and a transformation, and for generating a transformed image;
   a compositor for combining the reference image and the transformed image to generate a composite image;
   an energy calculator for receiving the composite image and for determining a focus measure based on an energy level of the composite image; and
   a transformation generator for receiving the focus measure and for generating the transformation in accordance with the focus measure such that the transformation is selected to correspond to a focus for the composite image.

7. A device according to claim 6, wherein the transformation generator further comprises:
   a maximizer for determining which parameters for the transformation result in an optimal value for the focus measure.

8. A device according to claim 6, wherein the transformer further comprises:
an interpolator for increasing resolution of parameters of the transformation.

9. A device according to claim 6, further comprising:
a filter calculator for modifying the composite image such that the noise of the composite image has been reduced, the noise being reduced by increasing energy contributions from selected parts of the composite image which contribute a relatively larger proportion of alignment information than noise, and by decreasing energy contributions from other parts of the composite image which contribute a relatively larger proportion to noise than to alignment information.

10. A device according to claim 9, wherein the filter calculator comprises:
a convoluter; and
a filter selected from the group consisting of: a Wiener filter, a modified second order difference filter, and a bandpass filter.

11. A device according to claim 9, further comprising:
a filter generator for determining filter characteristics of a filter for use in the filter calculator, the filter generator comprising:
(1) a frequency spectrum generator for receiving composite images and for generating image frequency spectra; and
(2) a filter optimizer for determining from the image frequency spectra those filter characteristics which maximize the signal-to-noise ratio of at least a portion of the composite images.

12. A device according to claim 9, further comprising:
a filter generator for determining filter characteristics of a filter for use in the filter calculator, the filter generator comprising:
a modified second order difference filter generator for selecting a modified second order difference filter from a group of modified second order difference filters by selecting the modified second order difference filter which yields a maximum ratio of peak energy level to peak energy width for a plurality of composite images.

13. A device according to claim 9, wherein the filter calculator only operates on the composite image in a single direction.

14. A device according to claim 9, wherein the filter calculator operates on selected sections of the composite image.

15. A device according to claim 12, wherein each filter of the group of modified second order difference filters comprises:
a first negative value, one or more first zero values, a positive value, one or more second zero values, and a second negative value.

16. A method for aligning a reference image with an unregistered image comprising the steps of:
transforming the unregistered image with a transformation to generate a transformed image;
combining the reference image and the transformed image to generate a composite image;
determining a focus measure from the composite image; and
generating the transformation in accordance with the focus measure such that the transformation is selected to correspond to a focus for the composite image.

17. The method of according to claim 16, wherein the transforming step further comprises the step of:
determining which parameters for the transformation result in an optimal value for the focus measure.

18. A method according to claim 16, wherein the transforming step further comprises the step of:
interpolating the unregistered image to allow increased resolution for parameters of the transformation.

19. A method according to claim 16, further comprising the step of:
filtering the composite image such that noise in the composite image is reduced, the noise being reduced by increasing energy contributions from selected parts of the composite image which contribute a relatively larger proportion of alignment information than noise, and by decreasing energy contributions from other parts of the composite image which contribute a relatively larger proportion to noise than alignment information.

20. A method according to claim 19, wherein the filtering step further comprises the steps of:
convoluting the composite image with a filter selected from the group consisting of: a Wiener filter, a modified second order difference filter, and a bandpass filter.

21. A method according to claim 19, further comprising the step of:
generating a filter from frequency spectra of one or more composite images; and optimizing the filter by selecting those filter characteristics which maximize the signal-to-noise ratio of at least a portion of the composite images.

22. A method according to claim 19, further comprising the step of:
generating a modified second order difference filter by selecting the modified second order difference filter from a group of modified second order difference filters which yields a maximum ratio of peak energy level to peak energy width for a plurality of composite images.

23. A method according to claim 16, wherein the determining step only operates on the composite image in a single direction.

24. A method according to claim 16, wherein the determining step operates on selected portions of the composite image.

25. A method according to claim 22, wherein each filter of the group of modified second order difference filters comprises:
a first negative value, one or more first zero values, a positive value, one or more second zero values, and a second negative value.

* * * * *